(12) United States Patent
Jiang

(10) Patent No.: US 11,271,646 B1
(45) Date of Patent: Mar. 8, 2022

(54) SYSTEM, METHOD AND APPARATUS FOR MONITORING OPTICAL PERFORMANCE

(71) Applicant: HUAWEI TECHNOLOGIES CO., LTD., Guangdong (CN)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/126,991

(22) Filed: Dec. 18, 2020

(51) Int. Cl.
*H04J 14/02* (2006.01)
*H04B 10/079* (2013.01)
*H04B 10/61* (2013.01)
*H04B 10/25* (2013.01)

(52) U.S. Cl.
CPC ....... *H04B 10/07955* (2013.01); *H04B 10/25* (2013.01); *H04B 10/61* (2013.01); *H04J 14/02* (2013.01)

(58) Field of Classification Search
CPC .... H04B 10/25; H04B 10/61; H04B 10/0753; H04B 10/0755; H04J 14/02
See application file for complete search history.

(56) References Cited

U.S. PATENT DOCUMENTS

| | | | |
|---|---|---|---|
| 10,979,148 B1* | 4/2021 | Zhou | H04B 10/63 |
| 2003/0223073 A1* | 12/2003 | VanWiggeren | G01M 11/331 356/477 |
| 2016/0164599 A1* | 6/2016 | Heismann | H04B 10/07955 398/26 |
| 2017/0230111 A1* | 8/2017 | Vila | H04B 10/61 |
| 2019/0052392 A1* | 2/2019 | DeAndrea | H04J 14/0228 |
| 2020/0266887 A1* | 8/2020 | Rudolph | H04B 10/07953 |

\* cited by examiner

*Primary Examiner* — Dzung D Tran
(74) *Attorney, Agent, or Firm* — BCF LLP

(57) ABSTRACT

The disclosed systems and methods are directed to monitor optical performance comprising receiving optical channel signals, wherein the optical channel signals are superimposed with pilot tone (PT) signals, operating a local oscillator (LO) including a tunable laser in a coarse scanning mode and a fine scanning mode and generate different LO signals in accordance with the mode in which the LO is being operated, combining the optical channel signals with at least one LO signal generated by the LO and generating a combined optical signal, detecting and converting the combined optical signal into an electrical signal, amplifying the electrical signal, converting the amplified electrical signal into a digital signal, processing the digital signal and extracting channel specific information included in the PT signals, computing channel power based on the channel specific information, and maintaining a management table.

22 Claims, 10 Drawing Sheets

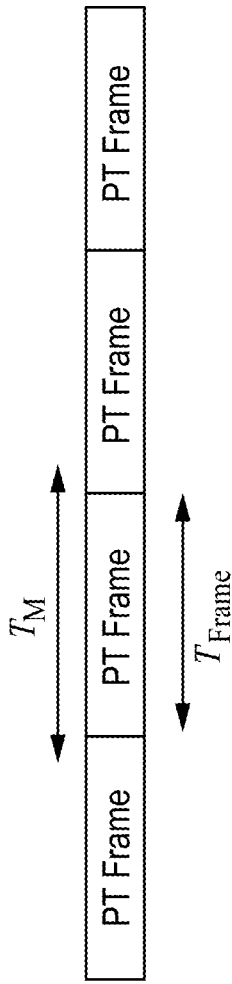
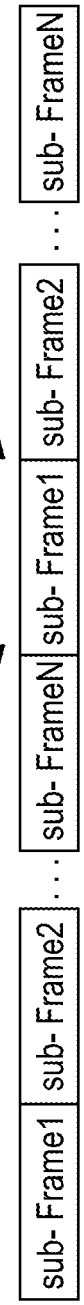
FIG. 7A
FIG. 7B

| C-Index | $C_1$ | $C_2$ | $C_3$ | $C_4$ | $C_5$ | $C_6$ | $C_7$ | $C_8$ | $C_9$ | $C_{10}$ | $C_{11}$ | ... | $C_{197}$ | $C_{198}$ | $C_{199}$ | $C_{200}$ |
|---|---|---|---|---|---|---|---|---|---|---|---|---|---|---|---|---|
| Signal flag | N | Y | Y | Y | Y | Y | N | N | Y | Y | N | | N | Y | Y | N |
| PT signal Reception flag | N | Y | Y | Y | Y | Y | N | N | Y | Y | N | | N | Y | Y | N |
| Channel association | | CH-1 $C_2, C_3$ | | CH-2 $C_4, C_5, C_6$ | | | | | CH-3 $C_9, C_{10}$ | | | | | CH-n $C_{198}, C_{199}$ | | |
| Channel C-Index | | $C_2$ | | | $C_5$ | | | | | $C_{10}$ | | | | $C_{198}$ | | |
| Fine Tuning flag | | Y | | | Y | | | | | N | | | | N | | |

- 802 — receiving high-speed optical channel signals, wherein the high-speed optical signals are superimposed with pilot tone (PT) signals
- 804 — operating a tunable laser in a coarse scanning mode and a fine scanning mode and generate different frequency signals
- 806 — combining the high-speed optical channel signals with at least one frequency signal generated by the tunable laser and generating a combined optical signal
- 808 — detecting and converting the combined optical signal into an electrical signal
- 810 — amplifying the electrical signal
- 812 — converting the amplified electrical signal into a digital signal
- 814 — processing the digital signal and extracting a channel specific information carried by the PT signal
- 816 — computing per channel power based on the channel specific information
- 818 — maintaining a management table, wherein the management table includes flags associated with different coarse scan indices (C-indices) and information associated with different channels

FIG. 10

SYSTEM, METHOD AND APPARATUS FOR MONITORING OPTICAL PERFORMANCE

CROSS-REFERENCE TO RELATED APPLICATIONS

This is the first application filed for the instantly disclosed technology.

TECHNICAL FIELD

The present disclosure generally relates to optical networks and, in particular, to a system, and a method for monitoring optical performance.

BACKGROUND

In addressing high data-throughput demands, fiber optic-based communications systems, such as, for example, dense wavelength division multiplex (DWDM) optical transmission and switching systems are configured to combine and simultaneously transmit multiple optical signals operating at different wavelengths along optical fibers at high speeds.

Optical performance monitoring is typically used for managing high capacity DWDM optical transmission and switching systems in Next Generation Networks (NGN). Generally, optical performance monitoring involves assessing the quality of data channel by measuring its optical characteristics without directly looking at the transmitted sequence of bits. It a potential mechanism to improve control of transmission and physical layer fault management DWDM optical transmission and switching systems.

In optical communications, typical roles for optical performance monitoring include ensuring correct switching in reconfigurable optical add-drop multiplexers, setting levels for dynamic equalization of the gain of optical amplifiers, and providing system alarms and error warning for lost or out of specification optical channels.

The optical component used fig this purpose in DWDM networks is known as an optical performance monitor (OPM), which measures channel power, wavelength, spectrum and optical signal-to-noise ratio (OSNR) for each channel. The OPM is an indispensable device in the operation and maintenance (OAM) of DWDM optical transmission and switching systems.

The OPM is essentially a miniature optical spectrum analyzer, that measures the spectrum across the entire transmission band (e.g., C band) with resolution much higher than the channel width and obtains per channel power.

Traditionally, the spectrum is obtained using a tunable optical filter. The passband of the optical filter is usually on the order of a few GHz. This spectral resolution may not meet the requirements of modern high capacity DWDM optical transmission and switching systems, where sub-GHz resolution is required to monitor the signal spectrum as well as the filtering effect of optical filters in the link, laser frequency/wavelength drifting.

Instead of using tunable optical filter, certain existing techniques rely on coherent OPM to measure the spectrum, where a tunable laser is used in a local oscillator (LO), and the beat frequency between LO and signal under test is measured. The resolution is determined by the laser linewidth and the bandwidth of the electrical circuit. In so doing, much high resolution (e.g., better than 0.1 GHz) can be readily achieved.

Although, coherent OPM provides very good spectral resolution however, coherent OPM requires a large number of measurement samples, and long measurement time (on the order of approximately 1s) for a sweep (entire scanning across the wavelength range, usually C band, L band, or C+L band).

With this said, there is an interest in improving the performance of coherent OPM in for monitoring optical characteristics of multiple optical signals travelling in the DWDM optical transmission and switching systems in an efficient manner.

SUMMARY

The embodiments of the present disclosure have been developed based on developers' appreciation of shortcomings associated with the prior art namely, operating a coherent optical performance monitor (OPM) in an efficient manner in order to reduce the time required to monitor channel performance such as monitoring signal power travelling in a channel.

In accordance with the first broad aspect of the present disclosure, there is provided an optical performance monitor (OPM) comprising: an input port configured to receive optical channel signals, wherein the optical channel signals are superimposed with pilot tone (PT) signals; a local oscillator (LO) including a tunable laser configured to operate in a coarse scanning mode and a fine scanning mode and to generate different LO signals in accordance with the mode in which the LO is being operated; at least one optical coupler configured to combine the optical channel signals with at least one LO signal generated by the LO and to generate a combined optical signal; at least one photo detector configured to detect the combined optical signal and to convert the detected combined optical signal into an electrical signal; at least one amplifier to amplify the electrical signal; at least one analog-to-digital convertor (ADC) to convert the amplified electrical signal into a digital signal; a digital signal processor configured to: process the digital signal and extract channel specific information included in the PT signals, and compute channel power based on the channel specific information; and a controller configured to: control a frequency step size of the LO, and maintain a management table, wherein the management table includes flags associated with different coarse scan indices (C-indices) and information associated with different channels, in which the C-indices represent frequency slots at which the LO generates LO signals when operated under coarse scanning mode.

In accordance with other aspects of the present disclosure, the OPM, wherein the frequency step size of the LO operated under coarse scanning mode is larger as compare to the frequency step size of the LO operated under fine scanning mode.

In accordance with other aspects of the present disclosure, the OPM, wherein: channel power computed by the digital signal processor when the LO is operated in the coarse scanning mode is an approximate channel power, and channel power computed by the digital signal processor when the LO is operated in the fine scanning mode is an integrated channel power.

In accordance with other aspects of the present disclosure, the OPM, wherein the digital signal processor computes a power scaling factor from the approximate channel power and the integrated channel power.

In accordance with other aspects of the present disclosure, the OPM, wherein based on the power scaling factor, the digital signal processor corrects the approximate channel power.

In accordance with other aspects of the present disclosure, the OPM, wherein the LO is operated more frequently in the coarse scanning mode as compare to the fine scanning mode.

In accordance with other aspects of the present disclosure, the OPM, wherein the flags in the management table includes a signal flag, and a PT signal reception flag.

In accordance with other aspects of the present disclosure, the OPM, wherein: the signal flag corresponding to a C-index is set as 'Y' if a combined optical signal is detected at the C-index and the amplitude of detected signal is above certain threshold; and the signal flag corresponding to a C-index is set as 'N' if either no signal is detected at the C-index or a combined optical signal is detected at the C-index and the amplitude of detected signal is below certain threshold.

In accordance with other aspects of the present disclosure, the OPM, wherein: the PT signal reception flag corresponding to a C-index is set as 'Y' if the channel specific information is extracted from the digital signal corresponding to the detected optical signal at the C-index; and the PT signal reception flag corresponding to a C-index is set as 'N' if the channel specific information has not been extracted yet from the digital signal corresponding to the detected optical signal at the C-index.

In accordance with other aspects of the present disclosure, the OPM, wherein if the signal flag corresponding to a C-index is set as 'Y' and the PT signal reception flag corresponding to the C-index is set as 'N', the controller is configured to prioritize the extraction of the channel specific information by instructing the LO to generate LO signals associated with the C-index.

In accordance with other aspects of the present disclosure, the OPM, wherein: the information associated with different channels in the management table includes entries corresponding to a channel association, a channel C-index, and a fine scanning flag, the channel association represents C-indices associated with a channel, the channel C-index represents one C-index selected from the C-indices associated with the channel, and the fine scanning flag represents a status about the channel that a fine scanning has been performed or not.

In accordance with other aspects of the present disclosure, the OPM, wherein the C-indices associated with the channel are determined by the channel specific information.

In accordance with other aspects of the present disclosure, the OPM, wherein the fine scanning flag is set as 'Y' if an integrated channel power associated with a channel is computed other the scanning flag is set as 'N'.

In accordance with other aspects of the present disclosure, the OPM, wherein the frequency step size of the LO operated under coarse scanning mode is further reduced in accordance with the selected C-indices.

In accordance with other aspects of the present disclosure, the OPM, wherein if a channel is removed, the controller is further configured to update the management table by operating the LO in coarse scanning mode.

In accordance with other aspects of the present disclosure, the OPM, wherein the PT signal includes PT frames and each PT frame includes entire PT information.

In accordance with other aspects of the present disclosure, the OPM, wherein the PT signal includes sub-PT frames and each sub-PT frame includes a portion of PT signal comprising channel spectral range information to facilitate coarse and fine scanning.

In accordance with the second broad aspect of the present disclosure, there is provided method to monitor optical performance comprising: receiving optical channel signals, wherein the optical channel signals are superimposed with pilot tone (PT) signals; operating a local oscillator (LO) including a tunable laser in a coarse scanning mode and a fine scanning mode and generate different LO signals in accordance with the mode in which the LO is being operated; combining the optical channel signals with at least one LO signal generated by the LO and generating a combined optical signal; detecting and converting the combined optical signal into an electrical signal; amplifying the electrical signal; converting the amplified electrical signal into a digital signal; processing the digital signal and extracting channel specific information included in the PT signals; computing channel power based on the channel specific information; and maintaining a management table, wherein the management table includes flags associated with different coarse scan indices (C-indices) and information associated with different channels, in which the C-indices represent frequency slots at which the LO generates LO signals when operated under coarse scanning mode In accordance with other aspects of the present disclosure, the method, wherein a frequency step size of the LO operated under coarse scanning mode is larger as compare to a frequency step size of the LO operated under fine scanning mode.

In accordance with other aspects of the present disclosure, the method, wherein: channel power computed when the LO is operated in the coarse scanning mode is an approximate channel power, and channel power computed when the LO is operated in the fine scanning mode is an integrated channel power.

In accordance with other aspects of the present disclosure, the method further comprises computing a power scaling factor from the approximate channel power and the integrated channel power.

In accordance with other aspects of the present disclosure, the method, wherein based on the power scaling factor correcting the approximate channel power.

In accordance with other aspects of the present disclosure, the method, wherein the LO is operated more frequently in the coarse scanning mode as compare to the fine scanning mode.

BRIEF DESCRIPTION OF THE FIGURES

Further features and advantages of the present disclosure will become apparent from the following detailed description, taken in combination with the appended drawings, in which:

FIG. 7A illustrates PT signal frames, in accordance with various embodiments of present disclosure;

FIG. 7B illustrates another example of PT signal frames, in accordance with various embodiments of present disclosure;

FIG. 8 illustrates a management table created and maintained by a controller, in accordance with various embodiments of present disclosure;

FIG. 10 depicts a flowchart representing a process corresponding to a method for monitoring optical performance implemented on coherent OPM, in accordance with various embodiments of the present disclosure.

Figure 1:
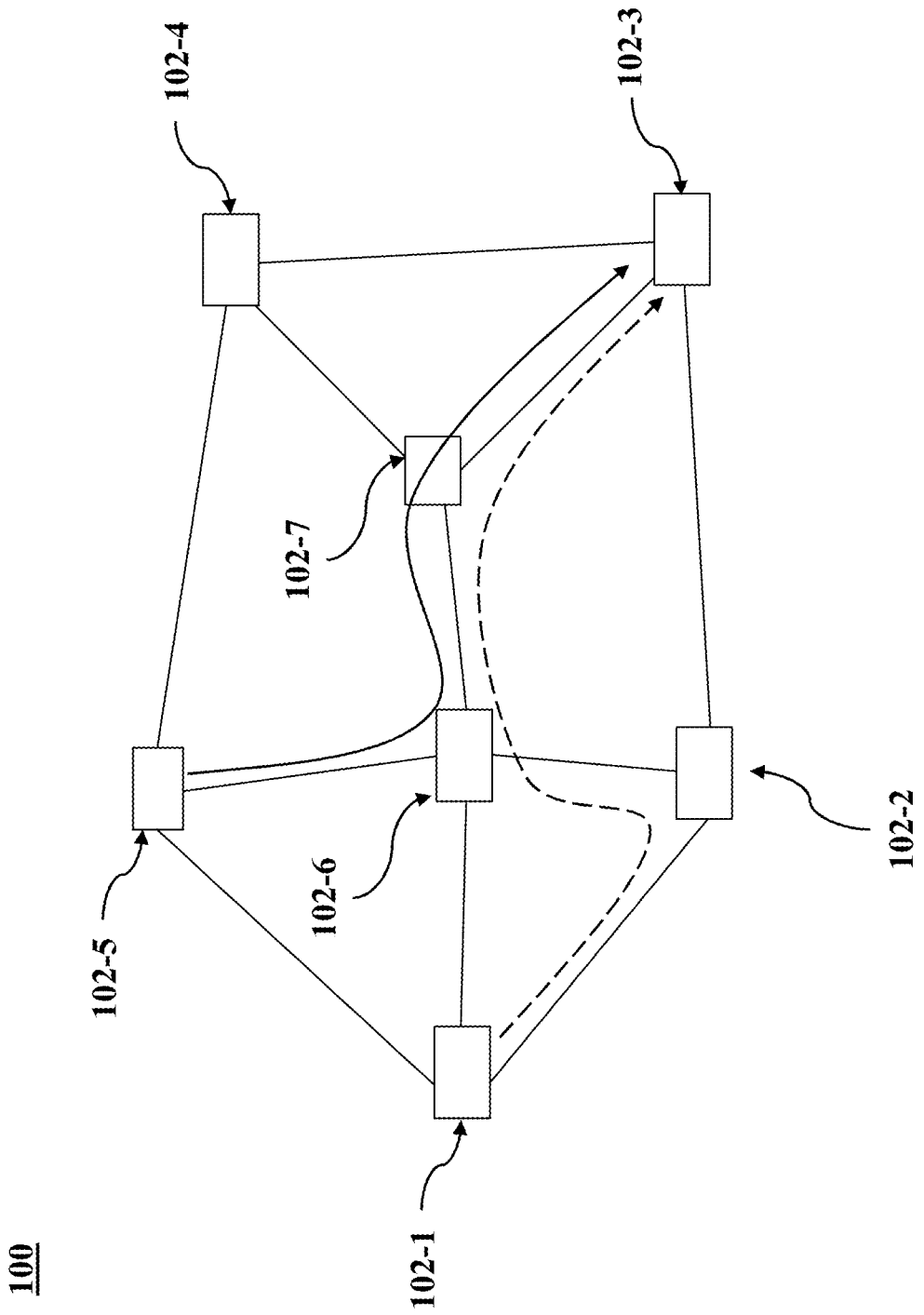
FIG. 1 (Prior Art) depicts a block diagram of a dense wavelength division multiplex (DWDM) optical transmission and switching system based optical network.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and method for monitoring optical performance.

Unless otherwise defined or indicated by context, all technical and scientific terms used herein have the same meaning as commonly understood by one of ordinary skill in the art to which the described embodiments appertain to.

In the context of the present specification, "controller" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and method for monitoring optical performance.

Referring now to the drawings, FIG. 1(Prior Art) depicts a block diagram of a dense wavelength division multiplex (DWDM) optical transmission and switching system based optical network 100. Optical network 100 typically has a plurality of nodes 102-1, 102-2 . . . 102-7 each node (e.g., 102-1, 102-2 . . . 102-7) may include optical multiplexing sections (OMSs) comprising optical add-drop multiplexers, such as, for example, a reconfigurable optical add-drop multiplexers (ROADMs) each containing at least one wavelength selective switch (WSS), multiplexers and demultiplexers or the like. Each node (e.g., 102-1, 102-2 . . . 102-7) may be configured to add, remove, and/or reroute a wavelength. Each OMS based node may further comprise multiple optical transport sections (OTSs), where at each OTS wavelength remains same.

Each node (e.g., 102-1, 102-2 . . . 102-7) in the optical network 100 may also incorporate one or more laser light sources configured to produce, emit, or radiate pulses of light with certain pulse duration. It is also contemplated that the emitted light may be single polarized, dual polarized, or randomly polarized, may have a particular polarization (e.g., linearly polarized, elliptically polarized, or circularly polarized) depending on the signal format.

Further, each node (e.g., 102-1, 102-2 . . . 102-7) in the optical network 100 may incorporate multiple optical amplifiers, e.g., erbium-doped fiber amplifiers (EDFAs), for amplifying the optical signals. The optical network 100 may further employ one or more optical network elements and modules (which may include either or both of active and passive elements/modules), such as, for example, optical filters, WSSs, arrayed waveguide gratings, optical transmitters, optical receivers, processors and other suitable components. However, for purposes of simplicity and tractability, these elements have been omitted from FIG. 1.

It is contemplated that nodes in the optical network may be communicatively connected by virtue of links including a plurality of optical fibers. The optical fiber may be of any suitable type such as, for example, single mode optical fiber, multi-mode optical fiber, standard single mode fibers (SSMFs), large effective area fibers (LEAFs) or the like. The links also include a plurality of optical amplifiers, such as, for example, EDFAs. The link between two nodes (e.g., 102-1 and 102-2) further includes optical amplifiers.

The optical network equipment, as referred to herein, comprises one or more passive and/or active optical network components and/or modules of the optical network 100, including, but not limited to, optical fiber, optical amplifiers, optical filters, optical links, WSSs, arrayed waveguide gratings, and laser light sources.

The Nodes (e.g., 102-1, 102-2 . . . 102-7) within the optical network 100 typically transmit signals on one of a plurality of optical wavelength channels. Throughout the present disclosure, the term "wavelength channels" denotes modulated optical signals at particular wavelengths. Wavelength channels are also referred to herein as "channels". Each channel is characterized by a channel bandwidth and a channel central frequency, typically defined by a frequency grid.

As referred to herein, the term "transmitted optical channel signal" refers to an optical channel signal before propagating through the optical network equipment. As referred to herein, the term "received optical channel signal" refers to an optical channel signal after propagating through the optical network equipment.

In the optical network 100, an amplitude modulation pilot tone signal may be used to monitor the channel power. The "amplitude modulation pilot tone signal" (also referred to herein as "PT signal") is a low-frequency (e.g., kHz to MHz) modulation of the intensity of the pilot tone applied to an optical channel signal. The PT signal may include single or multiple frequencies. The spectral characteristics of the PT signal should not limit the scope of present disclosure.

The modulation depth of the PT signal is usually small (e.g., a few percent of the channel power). The PT signal provides an in-band ancillary channel for performance monitoring.

Each channel can be modulated with a different PT signal. For example, different modulation frequencies may be applied to different channels. Different spreading sequences may also be applied to spectra-spread PT signals. Accordingly, a power of a particular PT signal may be used for indicating the power of the optical channel signal in a wavelength division multiplexed (WDM) system. The PT signal may be further modulated to carry channel characterizing information.

Figure 2:
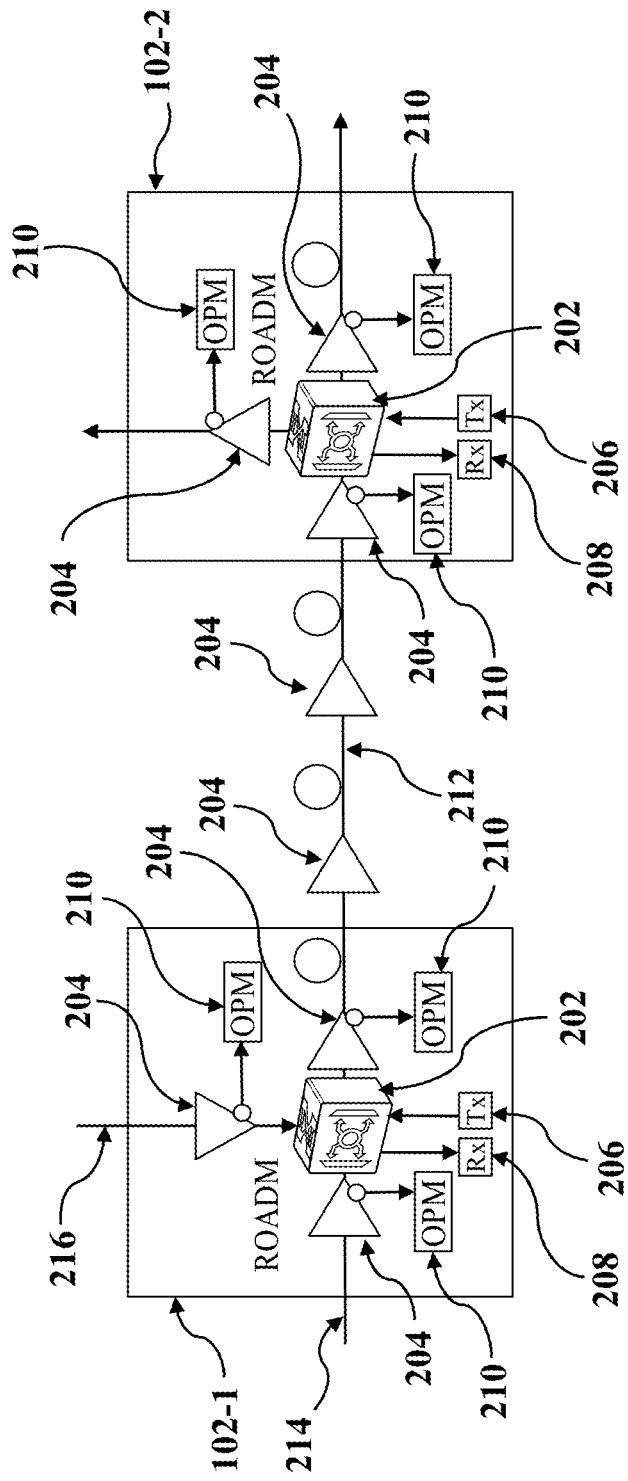
FIG. 2 (Prior Art) illustrates more details of a link between two nodes of the optical network.

FIG. 2 (Prior Art) illustrates more details of a link 200 between two nodes 102-1 and 102-2 of optical network 100. Nodes 102-1 and 102-2 may include ROADMs 202, optical amplifiers 204, coherent transmitters 206, coherent receivers 208, and coherent OPMs 210 among other components (not illustrated). The two nodes 102-1 and 102-2 may be connected by optical fibers 212. The node 102-1 may receive one or more DWDM signals 214, 216, drop one or more channels from DWDM signals 214, 216 at a receiver 208, add one or more channels generated by transmitter 206, and pass through other channels. The signals may be added or dropped using a WSS or a combination of WSS and other multiplexers and demultiplexers components (not shown). In some cases, dropped channels are converted from optical to electrical domain, and added channels are converted from electrical to optical domain. Otherwise, channels are switched or passed through in the optical domain.

Figure 3A:
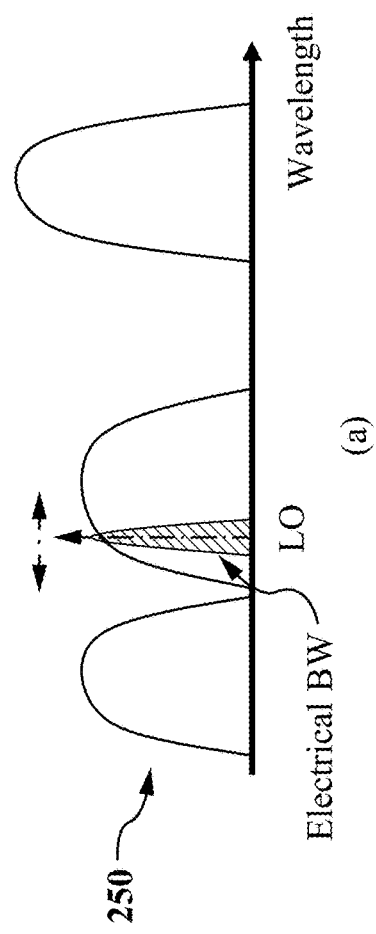
FIG. 3A (Prior Art) illustrates a representative spectrum of optical channel signals under test.

FIG. 3A (Prior Art) illustrates a representative spectrum of optical channel signals 252 wider test. With coherent OPM, a local oscillator (LO) may be used to measure the power of entire spectrum. In so doing, a wavelength/frequency of the LO can be tuned precisely. The shaded area illustrates an electrical bandwidth of a detection circuit, which determines a resolution bandwidth of a coherent OPM monitoring the performance of the optical channels.

For performance optimization and other operation/maintenance purposes, various optical networks (e.g., optical network 100) requires various information such as, for example, per channel power, channel specific information (central wavelength, modulation format, baud rate, spectrum shape, source/destination etc.), or the like. To this end, certain optical networks (e.g., optical network 100) rely on pilot tone (PT) technology.

Figure 3B:
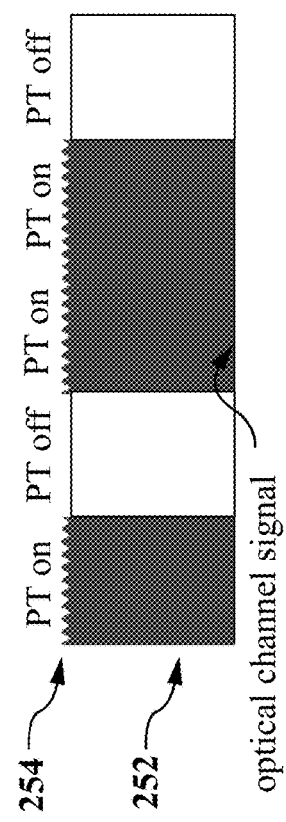
FIG. 3B (Prior Art) illustrates a representative optical channel signal 252 with amplitude modulated PT signal.

There are many different types for PT signals. The most common is amplitude modulation PT (AM-PT, or PT for simplicity). The transmitter 206 may apply a small, relatively low frequency (kHz/MHz) amplitude/intensity modulation the optical signal (GHz). Each optical signal may be applied a unique low frequency PT signal. In order to detect the PT signals, at least one photodetector can be used to detect all the optical channel signals without optical de-multiplexing. The existence and channel power of all channels can be simultaneously monitored by doing spectral analysis in electrical, or equivalently digital domain. This provides a low-cost monitoring solution. PT signal can be further turned on and off to carry channel specific information. FIG. 3B (Prior Art) illustrates a representative optical channel signal 252 with amplitude modulated PT signal 254.

Figure 4A:
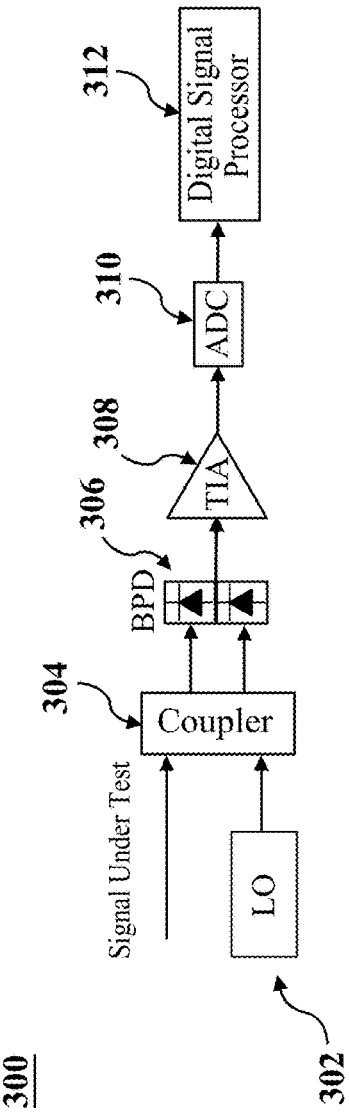
FIG. 4A (Prior Art) illustrates a single polarization based conventional coherent optical performance monitor (OPM)
Figure 4B:
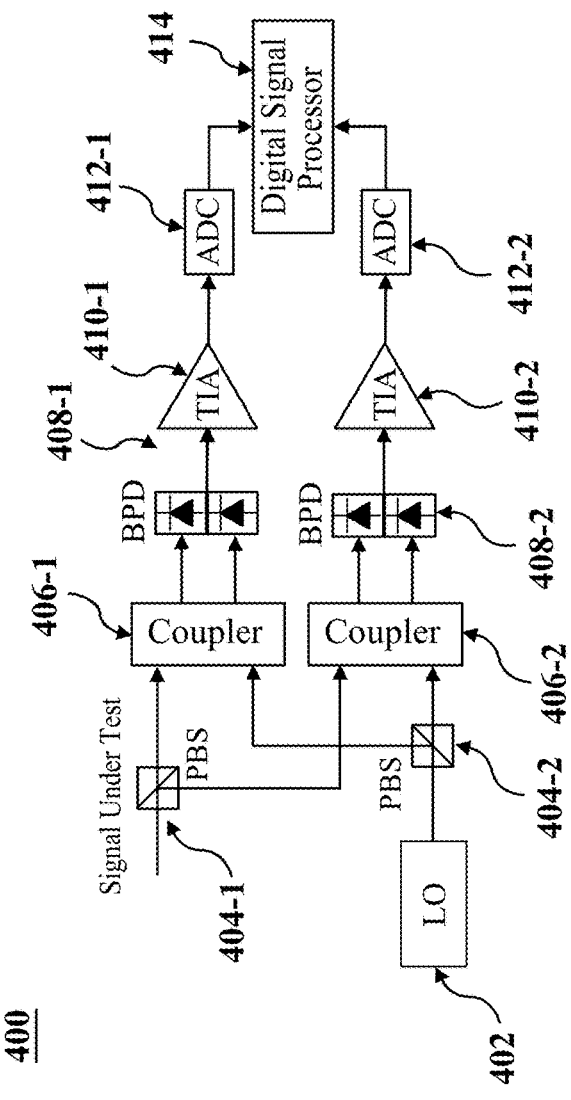
FIG. 4B (Prior Art) illustrates a dual polarization based conventional coherent OPM.

It is to be noted that in certain cases the optical channel signal may have a single polarization while in other cases the optical channel signal may have a dual polarization. If the optical channel signal is having a single polarization, optical network 100 may rely either on conventional coherent OPM 300 (as illustrated by FIG. 4A (Prior Art)) or on conventional coherent OPM 400 (as illustrated by FIG. 4B (Prior Art)) for monitoring channel performance. However, if the optical channel signal is having a dual polarization, optical network 100 may rely on conventional coherent OPM 400 (as illustrated by FIG. 4B (Prior Art)) for monitoring channel performance.

As shown, in FIG. 4A, the optical channel signal under test having a single polarization and local oscillator (LO) signals generated by a Local oscillator (LO) 302 including a tunable laser are combined by a coupler 304. A balanced photodetector (BPD) 306 converts the output of coupler 304 into an electrical signal which is amplified by an amplifier such as, for example, transimpedance amplifier (TIA) 308, and optionally by additional amplifiers. The amplified electrical signal is then converted to a digital signal by an analog-to-digital converter (ADC) 310. The digital signal is processed by a digital signal processor (DSP) 312. In certain cases, the processing can be done in analog domain too.

FIG. 4B illustrates conventional coherent OPM 400 operating on the optical channel signal under test having a dual polarization. The main difference between conventional coherent OPM 300 and conventional coherent OPM 400 is that in the latter optical channel signal under test is having a dual polarization is divided into two orthogonal polarized optical channel signals by polarization beam splitters (PBS) 404-1 and 404-2. The two orthogonal polarized optical channel signals are then separately processed by couplers 406-1 and 406-2, BPDs 408-1 and 408-2, TIAs 410-1 and 410-2, ADCs 412-1 and 412-2, and DSP 414.

It is to be noted that, although LOs 302 and 402 in conventional coherent OPM 300 and conventional coherent OPM 400 are being operated with a smaller step size, as small as 0.1 GHz or less, thereby providing a very good spectral resolution. Such step sizes require a large number of samples to be measured and requires a longer measurement time (on the order of 1s) for a sweep (entire scanning across the frequency range, typically C band, L band, or C+L band). However, a faster sweep speed (less than 0.1s) is desired while monitoring optical performance.

Moreover, conventional PT technology requires simultaneous and continuous detection of all channels. However, conventional coherent OPMs 300 and 400 monitor one spectral component at a any given time. Thus, there is an interest in developing a coherent OPM which provides a faster sweep speed and is efficiently compatible with the PT technology.

Figure 5:
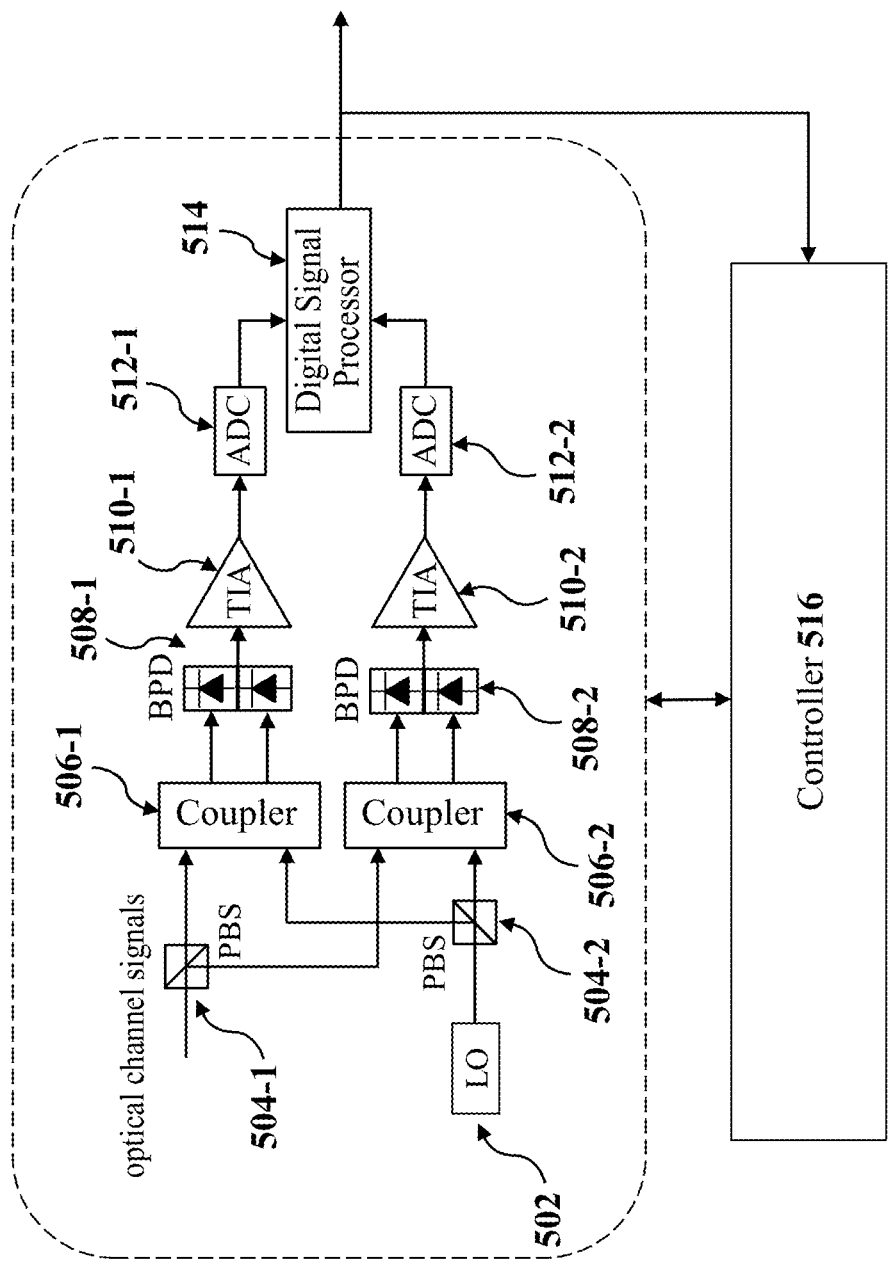
FIG. 5 illustrates a coherent OPM included in optical network, in accordance with various embodiments of present disclosure.

With this said, FIG. 5 illustrates a coherent OPM 500 included in optical network 100, in accordance with various embodiments of present disclosure. As shown, coherent OPM 500 includes, a LO 502, PBSs 504-1 and 504-2, couplers 506-1 and 506-2, BPDs 508-1 and 508-2, TIAs 510-1 and 510-2, ADCs 512-1 and 512-2, DSP 514, and controller 516. It is to be noted that, coherent OPM 500 may include other components and modules. However, for the purpose of simplicity, such components and modules have been omitted from FIG. 5.

It has been observed that a channel's spectrum is relatively stable, and it is possible to derive the channel power from a small portion of a signal channel spectrum. To this end, controller 516 may be configured to control and configure various components of coherent OPM 500 to perform coarse scanning, PT signal reception (may include extraction of channel specific information) and fine scanning.

The LO 502 may include a tunable laser and may be configured to operate in a coarse scanning mode and a fine scanning mode and generate different LO signals. For a given spectrum bandwidth, a step size of frequency with which LO 502 generates different LO signals may depend upon the mode in which LO 502 is being operated. By way of example, for a spectrum bandwidth of 5 THz, if LO 502 is operated in the coarse scanning mode, the generated LO signals may have a frequency step size of 25 GHz (i.e., two optical signals are spaced at a frequency difference of 25 GHz). On the other hand, for a spectrum bandwidth of 5 THz, LO 502 is operated in the fine scanning mode, the generated LO signals may have a frequency step size of 0.1 GHz (i.e., two optical signals are spaced at a frequency difference of 0.1 GHz). The frequency step size of LO 502 operated under coarse scanning mode is larger as compare to the frequency step size of LO 502 operated under fine scanning mode.

It is to be noted that, in certain embodiments, controller 516 may control the mode of operation of LO 502 and may control a frequency step size with which LO 502 may generate LO signals.

The controller 516 may control the operation of LO 502 in a manner that, during coarse scanning, LO 502 may generate optical LO signals with a larger frequency difference (i.e., a large frequency step size).

In the modern DWDM fiber optical communication systems, a baud rate of the optical channel signals is dominantly larger than 25Gb. Such as, for example, 100 Gbps QPSK, optical channel signals require a baud rate of approximately 34Gb. Therefore, a 25 GHz of frequency step size may assure that each channel has at least one coarse optical signal and that no channel is missed during coarse scan.

The above fixed frequency step size may be used during the initial coarse scan, when no channel information is available with coherent OPM 500. Once, the channel information, such as for example, baud rate, per channel bandwidth or similar operational parameters has been extracted (as will be discussed below), the frequency step size may be changed as per requirement.

In case the baud rate is more than an assumed baud rate (e.g., 34 Gb), the frequency step size may be increased to cover at least one spectral location in per channel. On the other hand, if the baud rate is less than the assumed baud rate (e.g., 34 Gb), the frequency step size may be reduced for further speed improvement.

Figure 6A:
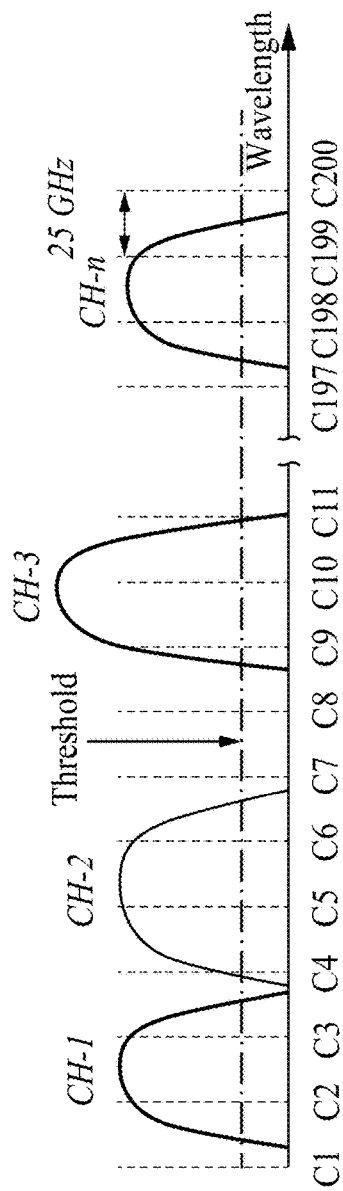
FIG. 6A illustrates an example of coarse scan, in accordance with various embodiments of present disclosure.

FIG. 6A illustrates an example 550 of coarse scan, in accordance with various embodiments of present disclosure. Let $C_1, C_2, \ldots C_n$ be the coarse scan indices referred to as C-indices, the C-indices may represent frequency slots at which at which LO 502 may generate LO signals when operated under coarse scan mode. By way of example, the entire spectral range to be measured is divided into 200 frequency slots. It has been assumed that each channel (e.g., CH-1, CH-2, CH-3, . . . CH-n) has a spectral width larger than the frequency step size of 25 GHz. It is to be noted that it is not necessary to have measurements at multiple frequency slots for a given channel. In order to reduce the number of measurements, one C-index out of multiple C-indices may be selected by controller 516 to represent that channel. In selecting C-index for a given channel, the power at C-index must be greater than a threshold to make sure it's a signal channel, not background noise.

Figure 6B:
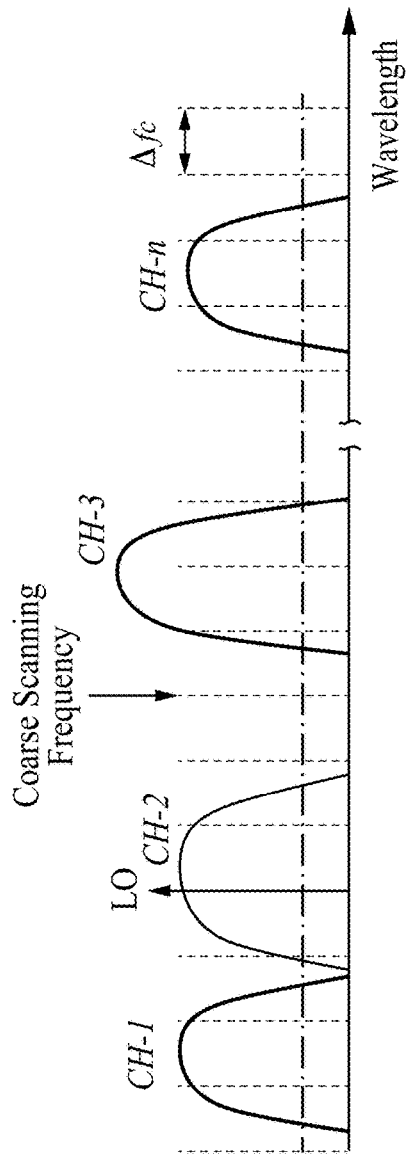
FIG. 6B illustrates a general example of coarse scan performed with a frequency step size of $\Delta f_c$, in accordance with various embodiments of present disclosure.

It is to be noted that the frequency step size of 25 GHz is merely discussed as a non-limiting example, in accordance with various embodiments of the present disclosure and any other suitably larger or smaller step size may be selected by controller 516 in accordance with the requirement of optical network 100. FIG. 6B illustrates a general example 560 of coarse scan performed with a frequency step size of $\Delta f_c$, in accordance with various embodiments of present disclosure.

Going back to FIG. 5, coherent OPM 500 may include an input port (not illustrated for the purpose of simplicity) to receive the optical channel signals whose performance to be monitored. The optical channel signals may be superimposed with PT signals. It is assumed that the optical channel signals have a dual polarization, however, the optical channel signals may have any orientation and the coherent OPM 500 may have the components accordingly.

With this said, in certain embodiments, the optical channel signals are divided into two sets of orthogonal polarized optical channel signals by PBS 504-1. The first set of orthogonal polarized optical channel signals may be forwarded to coupler 506-1 and the second set of orthogonal polarized optical channel signals may be forwarded to coupler 506-2.

As previously noted, the optical channel signals may be amplitude modulated with required PT signals. In certain embodiments, transmitter 206 may be configured to modulate the amplitude of the optical channel signal with a PT signal. In some examples, prior to modulating the amplitude, transmitter 206 may encode the PT signal. It is to be noted that how transmitter 206 encodes and/or modulate the optical channel signal should not limit the scope of present disclosure.

In one non-limiting embodiment, transmitter 206 may receive a data bit stream comprising bit values of 1 and bit values of 0. The data stream may include channel specific information such as central wavelength, modulation format, baud rate, spectrum shape, source/destination etc. The transmitter 206 may convert the data bit stream into a coded data stream and encode a PT signal with the coded data stream to produce a coded PT signal. Further, transmitter 206 may modulate an amplitude of the optical channel signal with the coded PT signal. The steps of receiving, converting, encoding, and modulating may be performed by an encoder included in transmitter 206.

FIG. 7A illustrates PT signal frames 570, in accordance with various embodiments of present disclosure. As shown, only a small time window may be used for PT detection, which places certain requirements to be fulfil by the PT data structure. PT data is usually static, and the amount of data to be carried is usually small (e.g., few hundreds of bits). In one embodiment, transmitter 206 may put entire PT information in one PT frame, and the PT frame is repeatedly transmitted with the same data. In order to recover the PT Data, the duration $T_M$ to measure a PT frame may be longer than the PT frame duration $T_{Frame}$.

In another embodiment, the PT data may be transmitted over multiple repeated sub-PT frames 580 as illustrated in FIG. 7B. Each of the sub-PT frames 580 may include channel spectral range information to facilitate coarse and fine scanning. Other less urgent information may be sent over in multiple sub-PT frames 580. By detecting any one sub-PT frame, the channel's spectral range information may be obtained.

It is to be noted that each transmitter 206 may transmit its own PT signal. In a link between two nodes (e.g., 102-1, 102-2, etc.) with many optical channel signals, the PT frames of different channels may not be synchronized. It may be difficult to pre-determine the frame/sub-frame timing, however, with the cyclic/quasi-cyclic nature of PT frames may provide an efficient means to correlate the PT frames with the associated transmitters 206.

Returning to FIG. 5, LO 502 may generate LO signals spaced $\Delta f_c$ from each other. The value of $\Delta f_c$ may be provided by controller 516. By way of example, if the channel operating frequency range is 191-196 THz, LO 502 may generate LO signals of 191.025 THz, 191.050 THz, 191.075 THz, and so on. However, LO 502 may stay at a particular frequency until a PT signal is detected. The LO 502 may forward the LO signal to PBS 504-2 for generating two orthogonal polarized LO signals. The first orthogonal polarized LO signal may be forwarded to coupler 506-1 and the second orthogonal polarized LO signal may be forwarded to coupler 506-2.

The couplers 506-1 and 506-2 may combine the orthogonal polarized optical channel signals with the orthogonal polarized LO signals to generate combined optical signals. The combined optical signals may represent the spectral components extracted from the orthogonal polarized optical channel signals located at the frequency of the orthogonal polarized LO signals respectively.

The BPD 508-1 and 506 may convert the output of couplers 506-1 and 506-2 (i.e., the combined optical signal) into an electrical signal. Once, the extracted the spectral components from the orthogonal polarized optical channel signal is converted to the electrical signal, LO 502 may generate the next LO signal to extract other spectral components.

The BPDs 508-1 and 508-2 may transmit the electrical signals to TIAs 510-1 and 510-2. The TIAs 510-1 and 510-2 may amplify the electrical signal, applies low pass filtering and forward the amplified electrical signals to ADC 512-1 and 512-2. In certain embodiments, TIAs 510-1 and 510-2 may be followed by additional electrical amplifiers omitted for the purpose of simplicity. The ADC 512-1 and 512-2 may convert the amplified electrical signals to digital signals and forward the digital signals to DSP 514.

The DSP 514 may be configured to process the digital signals. In so doing, DSP 514 may extract the PT signal and decode the channel specific information such as central frequency, modulation format, baud rate, spectrum shape, spectral information, source/destination etc. from the PT signal. It is to be noted that how DSP 514 extracts the PT signal and decode the channel specific information should not limit the scope of present disclosure.

With the channel specific information, DSP 514 may determine which C-indices a channel cover. Such as, for example, as shown in FIG. 6A, the first channel CH-1 includes C-indices $C_1$, and $C_2$, the second channel CH-2 includes C-indices $C_4$, $C_5$, and $C_7$ and so on. The DSP 514 may provide such information to controller 514. Using the channel specific information, DSP 514 may be configured to compute per channel power.

In certain embodiments, controller 514 may create and maintain a management table 600 as illustrated in FIG. 7, in accordance with various embodiments of present disclosure. For each C-index, management table 600 may maintain the associated flags and information associate with different channels, such as, for example, signal flag, PT signal reception flag, channel association, channel C-index, fine scanning flag (details of fine scanning will be discussed later in the disclosure). It is to be noted that management table 600 may include additional entries associated with other flags and information but have been omitted for the purpose of simplicity.

The signal flag corresponding to a C-index may be set as 'Y' in case a combined optical signal is detected by DSP 514 at a particular frequency slot associated with a C-index. Such as, for example, if a combined optical signal is detected by DSP 514 at a frequency slot (e.g., 191.050 THz) associated with the C-index $C_2$ and the power of the detected signal is above certain threshold, the signal flag may be set as 'Y' for the C-index $C_2$. Further, the signal flag corresponding to a C-index may be set as 'N' in case either no signal is detected by DSP 514 at a particular frequency slot associated with a C-index or the power of the detected signal is below certain threshold. Such as, for example, if no signal is detected by DSP 514 at a frequency slot (e.g., 191.175 THz) associated with the C-index $C_7$ and or the power of the detected signal is below certain threshold, the signal flag may be set as 'N' for the C-index $C_7$.

The PT signal reception flag corresponding to a C-index may be set as 'Y' in case the channel specific information in the PT signal associated with signal detected by DSP has been extracted by DSP 514. In case, DSP 514 is not able to extract the channel specific information in the PT signal (such as, for example, at the start up of coherent OPM 500 and/or adding of a channel by one or more ROADMs 202), the PT signal reception flag corresponding to a C-index may be set as 'N'. It may not possible for DSP 514 to extract the channel specific information in the PT signals for all channels in one PT signal reception cycle. In case, PT signal reception flag is set as 'N' for a C-index with signal having signal flag being set as 'Y', controller 516 may prioritize the extraction of channel specific information by instructing LO to generate LO signals associated with the C-index.

The channel association may represent the channel and the associated C-indices based on the channel specific information extracted from the PT signal. By way of example, C-indices $C_2$, and $C_3$ may be corresponds to channel CH-1, C-indices $C_4$, $C_5$ and $C_6$ may be corresponds to channel CH-2 and so on.

As previously discussed, for a particular channel, single PT signal detection should be enough for extracting channel specific information. The channels in which more than one signal samples have been detected, such as for example, for channel CH-1, signals have been detected at frequency slot corresponding to the C-indices $C_2$ and $C_3$, controller 516 may specify in management table 600 which C-index may be used for PT signal detection for future processing. The channel C-index may represent a one C-index selected from the C-indices associated with a particular channel for future processing during coarse scanning. By way of example, C-index $C_2$ may represent channel CH-1, C-index $C_5$ may represent channel CH-2, and so on. The channel C-indices associated with a channel are determined from channel specific information.

In case a channel is removed, a C-index may change from having a signal (the Signal flag set to Y) to not having a signal (the Signal flag is set to N), its associated PT signal reception flag and channel C-index and other entries may be removed by controller 516. And, LO 502 may be configured to operate in coarse scanning mode again.

The management table 600 may filled as soon as the associated information is available and may be refreshed on regular intervals by controller 516. In some embodiments, during normal operations, management table 600 filled with all entries, the table may be refreshed with same priorities for all channels. While in other embodiments, refreshing of some entries may be prioritized over other depending upon system requirement.

Once, management table 600 has been filled, using the channel C-index entries and the associated channel specific information, DSP 514 may be configured to compute an approximate channel power using the power associated with the PT signal for a particular channel. The DSP 514 may compute the approximate channel power when LO 502 is operated in the coarse scanning mode. The approximate channel power may be computed using at least one signal sample for a channel.

After performing the coarse scanning and filling the entries in management table 600 for at least one cycle (i.e., traversing of all of the optical channel signals at least once), coherent OPM 500 may perform fine scanning. During fine scanning, controller 516 may alter the step size of LO 502 and the scanning of optical channel signals may be performed at a smaller step size (e.g., of the order of 0.1, 0.5 GHz or the like) as compare the frequency step size associated with the coarse scanning.

It is to be noted that other components of coherent OPM 500 may perform similar functionality when performing coarse scanning except for the fact LO 502 is now configured to operate with a smaller frequency step size. In certain embodiment, controller 516 may provide fine frequency step size to LO 502. The LO 502 may generate LO signals in accordance with the fine frequency step size. The couplers 506-1 and 506-2, BPDs 508-1 and 508-2, TIAs 510-1 and 510-2, ADCs 512-1 and 512-2, and DSP 514 may be configured to operate in a similar manner as discussed above.

The DSP 514 may compute an integrated channel power associated with different channels based on channel specific information such as, for example, spectrum range extracted from the PT signals. The DSP 514 may compute the integrated channel power when LO 502 is operated in the fine scanning mode. In certain embodiments, the integrated channel power may be computed by integrating the power associated with the samples collected during fine scanning over the spectrum associated with the channel. The spectrum information may be obtained from the associated channel specific information. The integrated channel power may be computed using multiple signal samples for a channel.

The controller 516 may update the fine scanning flag in management table 600. In case an integrated channel power associated with a channel (e.g., CH-1) is computed, the value of fine scanning flag corresponding to that channel may be set as 'Y'. Other wise the value of fine scanning flag corresponding to that channel may be set as 'N'.

Based on the approximate channel power value and integrated channel power value, DSP 514 may compute a power scaling factor. The power scaling factor may represent a factor by which the approximate channel power should be increased or decreased to make it equal to fine per power channel value. In certain embodiments, without limiting the scope of present disclosure, the power scaling factor may be computed by taking a ratio of approximate channel power value and integrated channel power value.

After computing integrated channel power for different channels, coherent OPM 500 may be configured to operate in coarse scanning mode and continue to monitor power of channels by using channel specific information extracted form the PT signal and then correcting (e.g., increasing or decreasing or not changing) the computed approximate channel power using the power scaling factor.

The management table 600 plays an important role in improving the performance of coherent OPM 500. Some of the non-limiting examples of how management table 600 is utilized by coherent OPM 500 are discussed in the following disclosure.

In some embodiments, based on PT signal reception flag, controller 516 may decide which channel is to be monitored in next cycle. By way of example, if a signal flag for a C-index $C_{10}$ has been set as 'Y' but the corresponding PT signal reception flag has been set as 'N', controller 516 may instruct LO 502 to tune to the frequency associated with the C-index $C_{10}$. In so doing, coherent OPM 500 may operate to extract channel specific information of the channel associated with the C-index $C_{10}$.

The coherent OPM 500 may compute an approximate channel power for different channels using the respective channel specific information. Since the computation of approximate channel power is based on large frequency step size of LO 502, hence the sweep time to traverse all the optical channel signals may be very less as compare to the conventional OPMs (e.g., 300 and 400).

To further reduce the frequency step size during coarse scanning, controller 516 may uses the channel association entries in management table 600 to select one C-index per channel. After first cycle, controller 516 may provide frequency components associated with the selected C-indices only, thereby further reducing the frequency step size and improving the speed of operation.

As previously discussed, coherent OPM 500 may be configured to perform fine scanning as well. The purpose of fine scanning is computing an integrated channel power which is closer to the actual channel power. It is to be noted that in various embodiments, unlike the conventional OPMs (e.g., 300 and 400) where the fine scanning is continuously performed for all the channels, in coherent OPM 500 the fine scanning may be performed in parts and is not performed frequently. That is LO 502 is operated more frequently in the coarse scanning mode as compare to LO 502 being operated in fine scanning mode.

By way of example, if controller 516 observed that the PT signal reception flags have been synchronized with the signal flags and the approximate channel powers have been computed, controller 516 may instruct LO 502 to operate with large step size. In certain embodiments, controller 516 may also provide a range of frequencies associated with one or more channels for fine scanning. Such as, for example, controller 516 may provide frequency components associated with the channel CH-1 extracted from PT signals. The coherent OPM 500 may perform fine scanning over the channel CH-1 and DSP 514 may compute the fine power of the channel CH-1. The controller 600 may update management table 600 by setting fine scanning flag associated with channel CH-1 as 'Y'.

The DSP 514 may also compute the power scaling factor using the approximate channel power and the integrated channel power for the channel CH-1. For future scanning, unless there is a change in the channel CH-1 (e.g., adding or dropping of signals, power loss is more in a channel, etc.), coherent OPM 500 may rely on the approximate channel power and the power scaling factor to determine the power associated with the channel CH-1.

It is to be noted that the above discussed technique may be applicable to all the channels. The coherent OPM 500 may compute integrated channel power for different channels in different cycles. For most of the cycles, coherent OPM 500 may operate in coarse scanning mode, thereby improving the speed of operation of coherent OPM 500.

Further, coherent DSP 514 may be configured to combine different integrated channel power for different channels to generate fine spectrum for the entire measurement spectrum band.

By virtue of optical performance monitoring by coherent OPM 500, it may include ensuring correct switching in reconfigurable optical add-drop multiplexers, setting levels for dynamic equalization of the gain of optical amplifiers, and providing system alarms and error warning for lost or out of specification optical channels.

It to be noted that various discussion in the present disclosure is related to frequency of signals. A person skilled in the art would understand that the concept discussed in the present disclosure are equally applicable to wavelength of signals.

Figure 9:
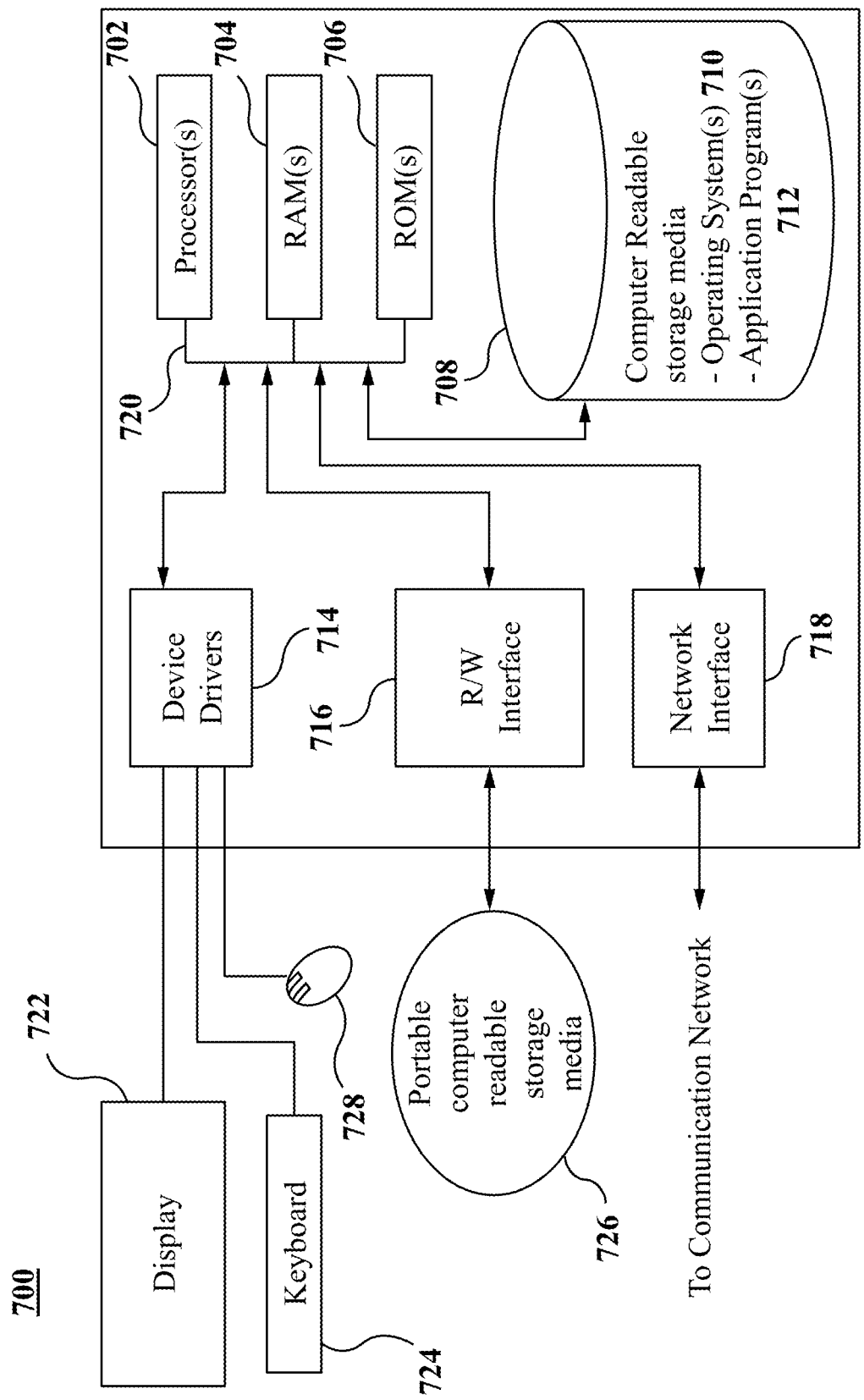
FIG. 9 depicts a high-level block diagram of exemplary components of a controller, in accordance with various embodiments of the present disclosure.

FIG. 9 depicts a high-level block diagram of exemplary components of controller 516, in accordance with various embodiments of the present disclosure. It should be appreciated that FIG. 9 provides only an illustration of one implementation of controller 516 and does not imply any limitations with regard to the environments in which different embodiments may be implemented. Many modifications to the depicted environment can be done to implement controller 516 without departing from the principles presented herein. The controller 516 may be a server, a desktop computer, a laptop computer, or any device that may be configured to implement the present technology, as should be understood by a person skilled in the art.

As shown, controller 516 employs one or more processors 702, one or more computer-readable random access memories (RAMs) 704, one or more computer-readable read only memories (ROMs) 706, one or more computer-readable storage media 708, device drivers 714, a read/write (R/W) driver interface 716, a network interface 718, all interconnected over a communication fabric 720. The communication fabric 720 may be implemented by any architecture designed for passing data and/or control information between processors (such as microprocessors, communications and network processors, etc.), system memory, peripheral devices, and any other hardware components within a system.

One or more operating systems 710 and one or more application programs 712 are stored on one or more of computer-readable storage media 708 for execution by one or more of the processors 702 via one or more of respective RAMs 704 (which typically include a cache memory). In the illustrated embodiment, each of the computer-readable storage media 708 maybe a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 716 reads from and writes to one or more portable computer-readable storage media 726. The application programs 712 may be related coherent OPM 500 and stored on one or more of portable computer-readable storage media 726, read via the respective R/W driver interface 716 and loaded into the respective computer-readable storage media 708.

Further, network interface 718 may be based on a TCP/IP adapter card or wireless communication adapter (such as a 4G wireless communication adapter using OFDMA technology). The application programs 712 on controller 516 may be downloaded to controller 516 from an external computer or external storage device via a communication network (for example, the Internet, a local area network or other wide area network or wireless network) and network interface 718. From network interface 718, application programs 712 may be loaded onto the computer-readable storage media 708. The controller 516 may connect to routers, firewalls, switches, gateway computers and/or edge servers of the communication network using copper wires, optical fibers, wireless transmission, and the like.

The controller 516 may also include a display screen 722, a keyboard or keypad 724, and a computer mouse or touchpad 728. The device drivers 714 may interface with display screen 722 for imaging, with the keyboard or the keypad 724, with computer mouse or touchpad 728, and/or with display screen 722 (which may be a touch sensitive display) for alphanumeric character entry and user selections. The device drivers 714, R/W driver interface 716 and network interface 718 may comprise hardware and software (stored on the computer-readable storage media 708 and/or the ROM 706).

FIG. 10 depicts a flowchart representing a process 800 corresponding to a method for monitoring optical performance implemented on coherent OPM 500, in accordance with various embodiments of the present disclosure.

The process 800 commences at step 802 where coherent OPM 500 receives optical channel signals, wherein the optical channel signals are superimposed with pilot tone (PT) signals. As noted above, coherent OPM 500 may include an input port (not illustrated for the purpose of simplicity) to receive the optical channel signals whose performance to be monitored. The optical channel signals may be superimposed with PT signals.

The process 800 advances to step 804 where coherent OPM 500 operates a LO in a coarse scanning mode and a fine scanning mode and generate different LO signals in accordance with the mode in which the LO is being operated. As previously discussed, LO 502 may be configured to operate in a coarse scanning mode and a fine scanning mode and generate different LO signals. For a given spectrum bandwidth, a step size of frequency with which LO 502 generates different LO signals may depend upon the mode in which LO 502 is being operated.

The process 800 moves to step 806 where coherent OPM 500 combines the optical channel signals with at least one LO signal generated by the LO and generating a combined optical signal. As previously noted, couplers 506-1 and 506-2 may combine the orthogonal polarized optical channel signals with the orthogonal polarized LO signals to generate combined optical signals.

The process 800 advances to step 808 where coherent OPM 500 detects and converts the combined optical signal. As previously discussed, BPD 508-1 and 506 may convert the output of couplers 506-1 and 506-2 i.e., the combined optical signal into an electrical signal.

The process 800 proceeds to step 810 where coherent OPM 500 amplifies the electrical signal. As discussed above, TIAs 510-1 and 510-2 may amplify the electrical signal and forward the amplified electrical signals to ADC 512-1 and 512-2.

The process 800 moves to step 812 where coherent OPM 500 converts the amplified electrical signal into a digital signal. As noted previously, ADC 512-1 and 512-2 may convert the amplified electrical signals to digital signals and forward the digital signals to DSP 514.

The process 800 advances to step 814 where coherent OPM 500 processes the digital signal and extracts a channel specific information included in the PT signal. As discussed above, DSP 514 may be configured to process the digital signals. In so doing, DSP 514 may extract the PT signal and decode the channel specific information such as central frequency, modulation format, baud rate, spectrum shape, spectral information, source/destination etc. from the PT signal.

The process 800 proceeds to step 816 where coherent OPM 500 computes channel power based on the channel specific information. As previously discussed, using the channel specific information, DSP 514 may be configured to compute channel power.

Finally, at step 818 coherent OPM 500 maintains a management table, wherein the management table includes the flags associated with different coarse scan indices (C-indices) and information associated with different channels, wherein C-indices represents frequency slots at which the LO generates LO signals when operated under coarse scanning mode. As noted above, controller 514 may create and maintain a management table 600. For each C-index, management table 600 may maintain the associated flags and information associate with different channels, such as, for example, signal flag, PT signal reception flag, channel association, channel C-index, fine scanning flag.

It is to be understood that the operations and functionality of coherent OPM 500, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. An optical performance monitor (OPM) comprising:
an input port configured to receive optical channel signals, wherein the optical channel signals are superimposed with pilot tone (PT) signals;
a local oscillator (LO) including a tunable laser configured to operate in a coarse scanning mode and a fine scanning mode and to generate different LO signals in accordance with the mode in which the LO is being operated;
at least one optical coupler configured to combine the optical channel signals with at least one LO signal generated by the LO and to generate a combined optical signal;
at least one photo detector configured to detect the combined optical signal and to convert the detected combined optical signal into an electrical signal;
at least one amplifier to amplify the electrical signal;
at least one analog-to-digital convertor (ADC) to convert the amplified electrical signal into a digital signal;
a digital signal processor configured to:
process the digital signal and extract channel specific information included in the PT signals, and
compute channel power based on the channel specific information; and
a controller configured to:
control a frequency step size of the LO, and
maintain a management table, wherein the management table includes flags associated with different coarse scan indices (C-indices) and information associated with different channels, in which the C-indices represent frequency slots at which the LO generates LO signals when operated under coarse scanning mode.

2. The OPM of claim 1, wherein the frequency step size of the LO operated under coarse scanning mode is larger as compare to the frequency step size of the LO operated under fine scanning mode.

3. The OPM of claim 1, wherein:
channel power computed by the digital signal processor when the LO is operated in the coarse scanning mode is an approximate channel power, and
channel power computed by the digital signal processor when the LO is operated in the fine scanning mode is an integrated channel power.

4. The OPM of claim 3, wherein the digital signal processor computes a power scaling factor from the approximate channel power and the integrated channel power.

5. The OPM of claim 4, wherein based on the power scaling factor, the digital signal processor corrects the approximate channel power.

6. The OPM of claim 1, wherein the LO is operated more frequently in the coarse scanning mode as compare to the fine scanning mode.

7. The OPM of claim 1, wherein the flags in the management table includes a signal flag, and a PT signal reception flag.

8. The OPM of claim 7, wherein:
the signal flag corresponding to a C-index is set as 'Y' if a combined optical signal is detected at the C-index and the amplitude of detected signal is above certain threshold; and
the signal flag corresponding to a C-index is set as 'N' if either no signal is detected at the C-index or a combined optical signal is detected at the C-index and the amplitude of detected signal is below certain threshold.

9. The OPM of claim 7, wherein:
the PT signal reception flag corresponding to a C-index is set as 'Y' if the channel specific information is extracted from the digital signal corresponding to the detected optical signal at the C-index; and
the PT signal reception flag corresponding to a C-index is set as 'N' if the channel specific information has not been extracted yet from the digital signal corresponding to the detected optical signal at the C-index.

10. The OPM of claim 7, wherein if the signal flag corresponding to a C-index is set as 'Y' and the PT signal reception flag corresponding to the C-index is set as 'N', the controller is configured to prioritize the extraction of the channel specific information by instructing the LO to generate LO signals associated with the C-index.

11. The OPM of claim 1, wherein:
the information associated with different channels in the management table includes entries corresponding to a channel association, a channel C-index, and a fine scanning flag,
the channel association represents C-indices associated with a channel,
the channel C-index represents one C-index selected from the C-indices associated with the channel, and
the fine scanning flag represents a status about the channel that a fine scanning has been performed or not.

12. The OPM of claim 11, wherein the C-indices associated with the channel are determined by the channel specific information.

13. The OPM of claim 11, wherein the fine scanning flag is set as 'Y' if an integrated channel power associated with a channel is computed other the scanning flag is set as 'N'.

14. The OPM of claim 11, wherein the frequency step size of the LO operated under coarse scanning mode is further reduced in accordance with the selected C-indices.

15. The OPM of claim 1, wherein if a channel is removed, the controller is further configured to update the management table by operating the LO in coarse scanning mode.

16. The OPM of claim 1, wherein the PT signal includes PT frames and each PT frame includes entire PT information.

17. The OPM of claim 1, wherein the PT signal includes sub-PT frames and each sub-PT frame includes a portion of PT signal comprising channel spectral range information to facilitate coarse and fine scanning.

18. A method to monitor optical performance comprising:
receiving optical channel signals, wherein the optical channel signals are superimposed with pilot tone (PT) signals;
operating a local oscillator (LO) including a tunable laser in a coarse scanning mode and a fine scanning mode and generate different LO signals in accordance with the mode in which the LO is being operated;
combining the optical channel signals with at least one LO signal generated by the LO and generating a combined optical signal;
detecting and converting the combined optical signal into an electrical signal;
amplifying the electrical signal;

converting the amplified electrical signal into a digital signal;

processing the digital signal and extracting channel specific information included in the PT signals;

computing channel power based on the channel specific information; and maintaining a management table, wherein the management table includes flags associated with different coarse scan indices (C-indices) and information associated with different channels, in which the C-indices represent frequency slots at which the LO generates LO signals when operated under coarse scanning mode.

19. The method of claim 18, wherein a frequency step size of the LO operated under coarse scanning mode is larger as compare to a frequency step size of the LO operated under fine scanning mode.

20. The method of claim 18, wherein:

channel power computed when the LO is operated in the coarse scanning mode is an approximate channel power, and channel power computed when the LO is operated in the fine scanning mode is an integrated channel power.

21. The method of claim 20 further comprises computing a power scaling factor from the approximate channel power and the integrated channel power.

22. The method of claim 21, wherein based on the power scaling factor correcting the approximate channel power.

* * * * *